Figure 1:
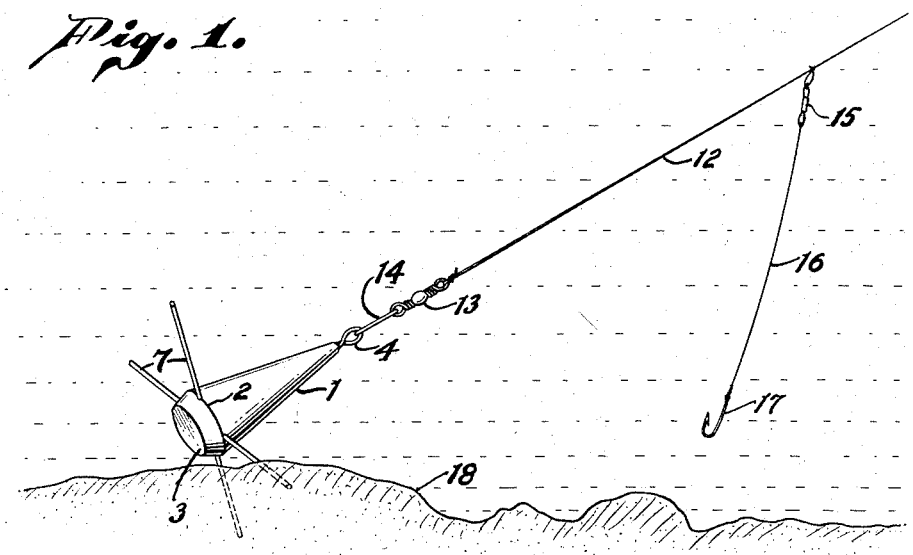

July 8, 1958 N. UEDA 2,841,916
SINKERS
Filed Oct. 26, 1956

NOBUO UEDA,
INVENTOR.

BY
ATTORNEY.

United States Patent Office 2,841,916
Patented July 8, 1958

2,841,916

SINKERS

Nobuo Ueda, Los Angeles, Calif.

Application October 26, 1956, Serial No. 618,522

4 Claims. (Cl. 43—44.96)

The present invention relates to sinkers.

So-called sinkers or weights are generally used with a fish line to assure that the line enters the water carrying with the said sinker the fish hook. However, when surf fishing is indulged in, the average sinker is affected by the ocean currents and moves away from the location selected by the fisherman.

The present invention has for an object the provision of a sinker for a fish line so constituted and arranged as to hold its position after being cast into the water and resting on the sand.

The sinker of the present invention has its parts so arranged that the same will not snag the fish line, when engaging kelp, and wherein when the fish line is reeled in, the line readily untangles itself from the sinker without "hanging up."

In its simplest embodiment, the invention comprises a body of weighted material and of a selected geometrical form, which body is provided with arms which extend outwardly from the body normal to the axis of the body. The arrangement of the sinker is such that the sinker, when engaging the ocean bottom, will have no tendency to cart-wheel due to the presence of ocean currents but will maintain a given position.

The invention is inexpensive in cost of manufacture, and generally superior to sinkers now known to the inventor.

With the above mentioned and other objects in view, the invention consists in the novel and useful provision, formation, construction, association, and relative arrangement of parts, members and features, all as shown in one embodiment in the accompanying drawing, described generally, and more particularly pointed out in the claims.

Figure 2:
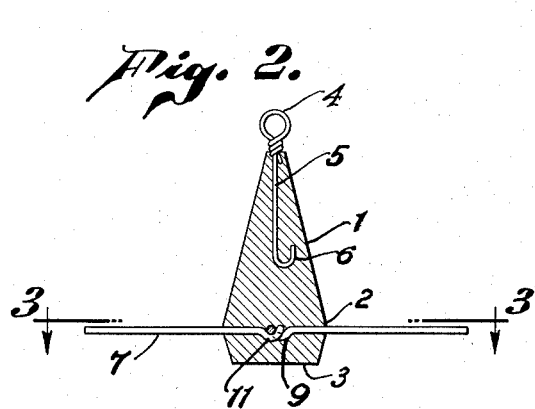
Figure 3:
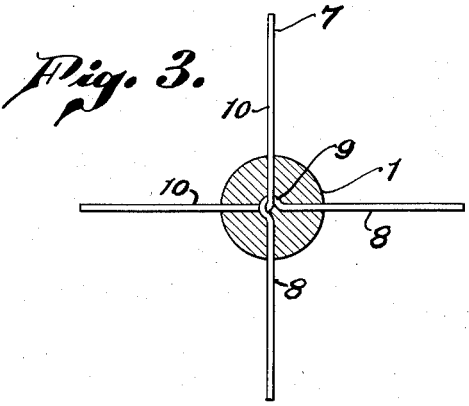
Figure 4:
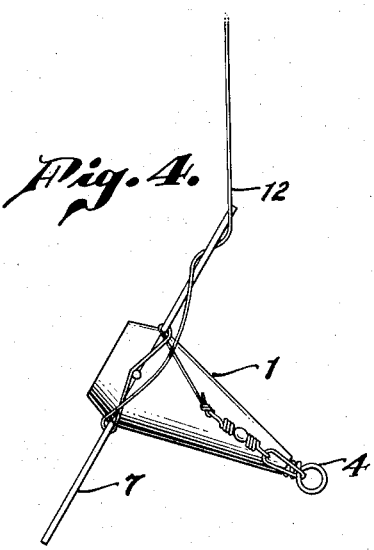

In the drawing:

Figure 1 is a perspective view of the invention, the body of water and water bed being shown in fragment with certain portions of the invention embedded in the water bed, Figure 2 is an enlarged view, the body of the sinker being shown in section, Figure 3 is a sectional view on the line 3—3 of Figure 2, and Figure 4 is a perspective view showing the fish line wrapped about the body and certain of the arms carried by the body.

Referring now with particularly to the drawing, the sinker includes a body 1 which, in the present instance, is of conical form, the portion of greatest diameter being shown at 2, while the portion included between the zone of greatest diameter 2 and the base 3 is of inverted, frusto-conical form. I do not necessarily adhere to any particular geometrical form for the body of the sinker other than that the form shown is convenient in actual use and service. The body, as is obvious, must be fabricated from a heavy material, such as lead or other metal. The vertex of the body is provided with an eye 4, this eye being formed on the end of a wire 5 having a hook end 6, the wire and hook end being embedded within the body so that the hook will prevent any withdrawal of the wire from the body 1. Arms 7 extend radially from the body, the arms in each instance being normal to the axis of the body 1, and said arms, in the present instance, extend outwardly from the zone of greatest diameter 2 of the body. Various methods may be utilized for holding the arms within the body, and I have found that the method illustrated in Figures 2 and 3 is quite satisfactory, wherein one pair of 90° arms 7, shown at 8, may be interconnected by a depressed curved corner piece 9, and that the other pair of arms, shown at 10, are similarly interconnected by a depressed curved corner piece 11, so that all of the arms will lie in the same plane. This form of connection between the pairs of arms allows the arms of the pairs shown at 8 and 10 to be in alignment. In addition, the looping together of the pairs of arms provides a convenient means for anchoring the arms within the body 1. The fish line 12 is secured to one end of a swivel 13, the opposite end of the swivel, by means of a connector 14, being fastened to the eye 4 of the sinker. The line 12 has a swivel 15, secured thereto, which swivel in turn connects with a line 16 leading to the fish hook 17. Flies may be connected to the fish line through the usual leaders, if desired.

The operation, uses and advantages of the invention just described are as follows:

When the fish line is cast into a body of water, the arms 7 will penetrate the bed 18, as shown for two of the arms in Figure 1. These arms are so arranged relative to the body as not to result in any wheeling action of the sinker on the bed 18. Hence, I have found that at least three or four arms must be utilized, which arms are equidistantly spaced apart. If a large number of arms are used, that is to say, greater than four, a wheeling action on the bed is likely to occur, and such action is not desired. The arms are preferably smooth and of rod like form.

In Figure 4, I have illustrated the line 12 wrapped around certain of the arms, which is likely to happen due to slack in the line 12. It is evident, however, that a pull on the line will cause rotation of the sinker and that the line wrapped around the different arms, as illustrated, will immediately untangle from the arms and body. The line would not untangle if the arms were not at right angles to the axis of the body. In other words, the arms 7 must extend from the body at right angles to the axis of the body. In addition to the ability of the present sinker to untangle itself from the line 12, the present device will not snag the line 12 in kelp, as the arms, by being smooth, without bends, and at right angles to the axis of the body readily cut through the kelp.

While the body is shown as a right circular cone, it is evident that other geometrical forms may be utilized as long as the body has an axis and the arms extend normal to the axis or altitude thereof.

The inventor is aware that certain devices for anchoring fish lines propose a weighted body having arms depending from the base of the body, which arms are usually of multiple form, that is, greater than four, and which arms are usually curved or extend downwardly parallel to the axis of the body and then extend outwardly and upwardly. However, said devices are unsatisfactory in actual use and service, as the fish line is easily snagged and an untangling of the fish line is difficult of accomplishment, as the fish line will wrap around the depending portions of the arms and not release from the angular portion of the arms. Furthermore, such devices will easily snag in kelp and result in breakage of the line or loss of the sinker and fish hook.

I claim:

1. A sinker having a body in the form of a right circular cone, an eye at the vertex of said cone for attachment with a fish line, and four equidistantly spaced apart arms extending outwardly at right angles to the axis of said cone adjacent the base of said cone, and all of said arms lying in the same plane.

2. A sinker including an elongated body provided at one end with means for attachment with a fish line, arms of equal length and spacing extending laterally from said body adjacent the opposite end thereof, said arms being formed for interconnection at the body axis, and all of said arms lying in the same plane.

3. A sinker including a conical body, the vertex of which is provided with means of attachment with a fish line, at least three equally spaced arms extending from the lateral surface of the conical body in right angular relationship to the axis of the body, and said arms being interconnected at the body axis and all of said arms lying in the same plane.

4. A sinker including a conical body, the vertex of which is provided with means of attachment with a fish line, two pairs of equal length arms extending from the lateral surface of the conical body in right angular relationship to the axis of the conical body with all of said arms lying in the same plane, each pair of arms being in 90° relationship and interconnected at the body axis.

References Cited in the file of this patent

UNITED STATES PATENTS

| | | |
|---|---|---|
| 1,810,565 | Kenely | June 16, 1931 |
| 2,037,232 | Hendricks | Apr. 14, 1936 |
| 2,239,889 | Hobbs | Apr. 29, 1941 |